(12) United States Patent
Bates et al.

(10) Patent No.: US 7,937,371 B2
(45) Date of Patent: May 3, 2011

(54) ORDERING COMPRESSION AND DEDUPLICATION OF DATA

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/049,178

(22) Filed: Mar. 14, 2008

(65) Prior Publication Data

US 2009/0234870 A1    Sep. 17, 2009

(51) Int. Cl.
*G06F 7/00* (2006.01)
*G06F 17/00* (2006.01)

(52) U.S. Cl. ........ 707/661; 707/662; 707/664; 707/692; 707/693

(58) Field of Classification Search .................. None
See application file for complete search history.

(56) References Cited

OTHER PUBLICATIONS www.datadomain.com/resources/faq.html webpage archived on Oct. 11, 2007.*
"Adaptive Lossless Data Compression Algorithm", ECMA, Jun. 1995, http://www.ecma.ch.
J. Nakajima, et al., "Performance Analysis and Parallel Implementation of Dedicated Hash Functions", Mitsubishi Electric Corporation, Proceedings of EUROCRYPT 2002, pp. 165-180, http://www.iacr.org/archive/eurocrypt2002/23320159/hash.pdf.
A. Osuna, "IBM System Storage N Series A-SIS Deduplication Deployment and Implementation Guide", IBM Corp., Redpaper, 2007.
US Application entitled "Limiting Deduplication based on Predetermined Criteria", serial number unknown, filing date Mar. 14, 2008, by inventors R. Haas, N. Haustein, G.A. Klein, U. Troppens and Daniel J. Winarski.

* cited by examiner

*Primary Examiner* — Jay A Morrison
(74) *Attorney, Agent, or Firm* — Rabindranath Dutta; Konrad Raynes & Victor LLP

(57) ABSTRACT

Data that is to be deduplicated and compressed is received. The data is compressed then deduplicated to generate first compressed then deduplicated data. The data is deduplicated then compressed to generate first deduplicated then compressed data. The first compressed then deduplicated data is stored if the first compressed then deduplicated data is smaller in size than the first deduplicated then compressed data. The first deduplicated then compressed data is stored if the first deduplicated then compressed data is smaller in size than the first compressed then deduplicated data.

20 Claims, 5 Drawing Sheets

ORDERING COMPRESSION AND DEDUPLICATION OF DATA

BACKGROUND

1. Field

The disclosure relates to a method, system, and article of manufacture for the ordering of the compression and the deduplication of data.

2. Background

Data compression may attempt to reduce the size of a file by eliminating redundant data within the file. A compressed file may be a smaller file than the original file and may consume less disk space than the original file. For example, a 700 KByte text file may be compressed to a 52 KByte file by substituting certain long character strings with shorter representations. Decompression algorithms may be used to recreate the original file from the compressed file. Data compression may be performed on other data structures besides files, such as, directories.

Data deduplication which is also known as single instance store or data folding refers to the process of eliminating or significantly reducing multiple copies of the same data. For example, data deduplication may eliminate duplicate files in a storage system or may remove duplicate portions of a single file.

SUMMARY OF THE PREFERRED EMBODIMENTS

Provided are a method, system, and article of manufacture, wherein data that is to be deduplicated and compressed is received. The data is compressed then deduplicated to generate first compressed then deduplicated data. The data is deduplicated then compressed to generate first deduplicated then compressed data. The first compressed then deduplicated data is stored if the first compressed then deduplicated data is smaller in size than the first deduplicated then compressed data. The first deduplicated then compressed data is stored if the first deduplicated then compressed data is smaller in size than the first compressed then deduplicated data.

In additional embodiments, a header corresponding to either the first compressed then deduplicated data or the first deduplicated then compressed data includes an indication of: (i) whether the data was first compressed then deduplicated or whether the data was first deduplicated then compressed; (ii) a compression scheme used on the data; and (iii) a decompression scheme used on the data.

In further embodiments, the indication includes the hash function and chunk size used for the deduplication scheme.

In still further embodiments, a command is received to reconstruct the data when the data has been stored either as the first deduplicated then compressed data or as the first compressed then deduplicated data. The indication included in the header is used to determine whether to first duplicate then decompress or whether to first decompress then duplicate in order to reconstruct the data.

In yet further embodiments, a plurality of compression applications and a plurality of deduplication applications are used to determine which compression and which deduplication application when ordered generates the smallest size deduplicated and compressed data, wherein a decision for whether to first compress then deduplicate or whether to first deduplicate then decompress is made for each file of a plurality of files.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Shrinking, i.e., reducing, the size of stored data may be useful for reducing the amount of physical storage needed in a computing environment. Certain embodiments reduce the size of the stored data by dynamically changing the order of compression and deduplication for each stored file. In certain embodiments, data is first compressed and then deduplicated for storage and in certain embodiments data is first deduplicated and then compressed for storage. The first compressed then deduplicated data is stored if the first compressed then deduplicated data is smaller in size than the first deduplicated then compressed data. The first deduplicated then compressed data is stored if the first deduplicated then compressed data is smaller in size than the first compressed then deduplicated data.

Additionally in certain embodiments, the compression algorithm and deduplication methods used are also changed dynamically. Header information included with the stored data provides a record of the order of compression and deduplication, and which compression and deduplication techniques were used. The header information is used for the decompression and duplication, i.e., un-deduplication, when the data is subsequently read back from the storage.

Exemplary Embodiments

Figure 1:
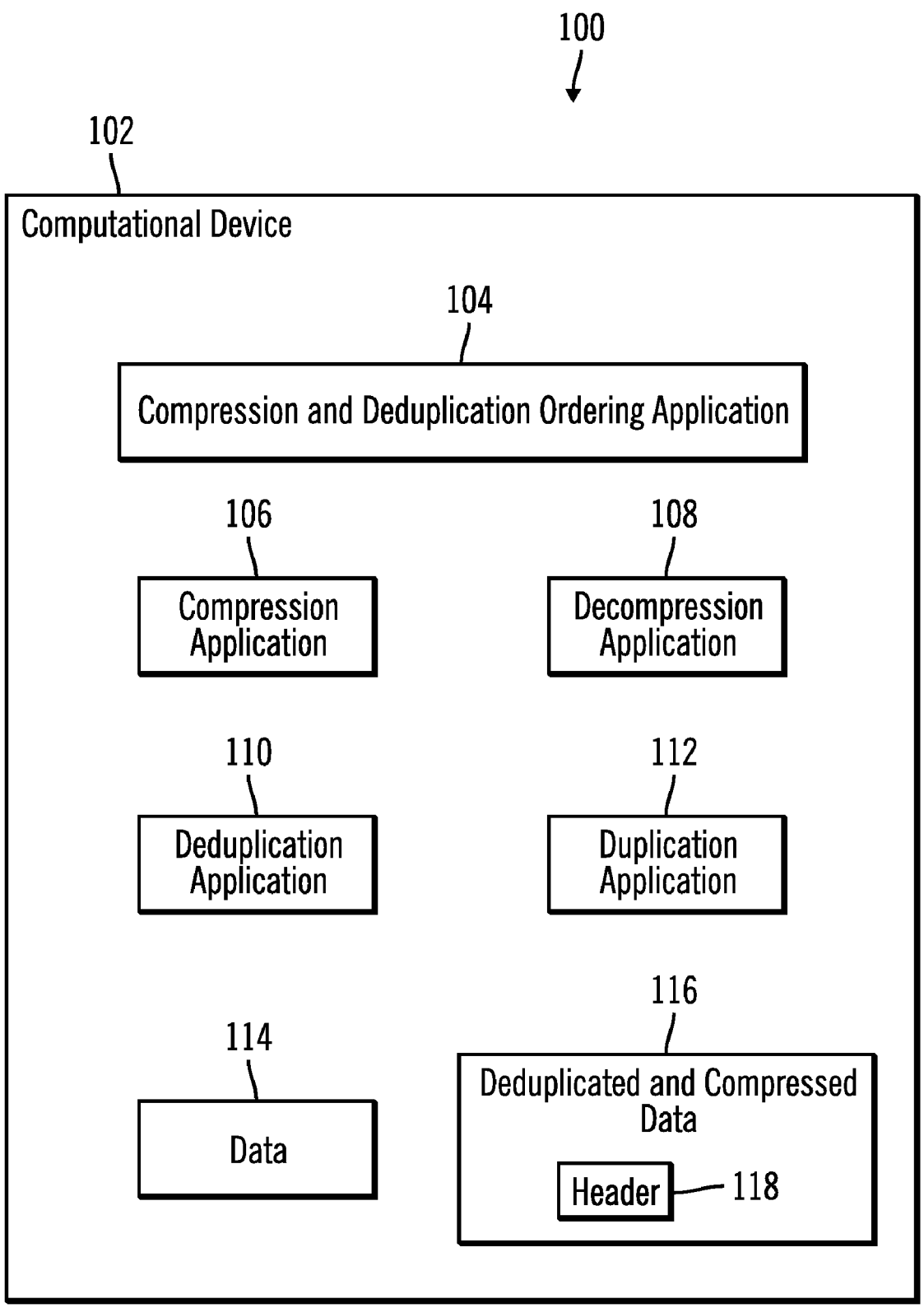
FIG. 1 illustrates a block diagram of a computing environment in which a computational device that includes a compression and deduplication ordering application is shown, in accordance with certain embodiments.

FIG. 1 illustrates a block diagram of a computing environment 100 in which a computational device 102 that includes a compression and deduplication ordering application 104 is shown, in accordance with certain embodiments. In addition to the compression and deduplication application 104, the computational device 102 may also include a compression application 106, a decompression application 108, a deduplication application 110, and a duplication application 112.

The computational device 102 may be any suitable device including those presently known in the art, such as, a personal computer, a workstation, a server, a mainframe, a hand held computer, a palm top computer, a telephony device, a network appliance, a blade computer, a storage server, etc. The compression and deduplication application 104, the compression application 106, the decompression application 108, the deduplication application 110, and the duplication application 112 may be implemented in hardware, software, firmware or any combination thereof.

The compression application 106 and the deduplication application 110 may be applied to the data 114 to generate deduplicated and compressed data 116. The decompression application 108 and the duplication application 112 may be applied to the deduplicated and compressed data 116 to reconstruct the data 114. The data 114 and the deduplicated and compressed data 116 may be stored in one or more storage devices coupled to the computational device 102. The deduplicated and compressed data 116 may include a header 118 that stores an indication of the deduplication and compression schemes used to generate the deduplicated and compressed data 116.

Figure 2:
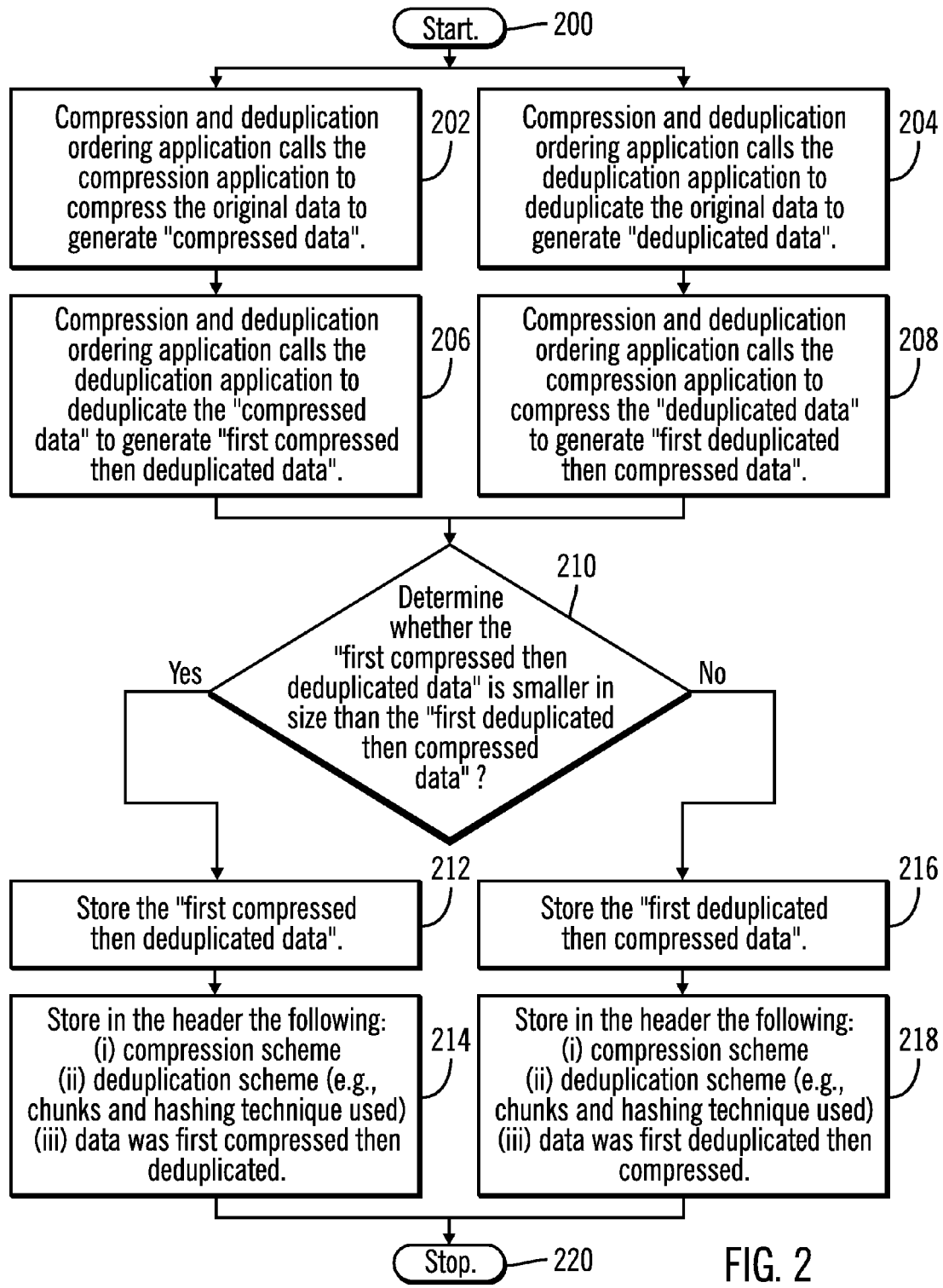
FIG. 2 shows a first set of operations for determining the order in which compression and deduplication are to be performed for storing data, in accordance with certain embodiments.

FIG. 2 shows a first set of operations for determining the order in which compression and deduplication are to be performed for storing data, in accordance with certain embodiments.

Control starts at block 200 and proceeds in parallel to blocks 202 and 204. At block 202, the compression and deduplication ordering application 104 calls the compression application 106 to compress the original data 114 to generate "compressed data", wherein "compressed data" is data that has been compressed. From block 202, control proceeds to block 206 where the compression and deduplication ordering application 104 calls the deduplication application 110 to deduplicate the "compressed data" to generate "first compressed then deduplicated data".

At block 204, the compression and deduplication ordering application 104 calls the deduplication application 110 to deduplicate the original data 114 to generate "deduplicated data". From block 204, control proceeds to block 208 where the compression and deduplication ordering application 104 calls the compression application 106 to compress the "deduplicated data" to generate "first deduplicated then compressed data".

From blocks 204 and 208 control proceeds to block 210 where the compression and deduplication order application 104 determines whether the "first compressed then deduplicated data" is smaller in size than the "first deduplicated then compressed data".

If the "first compressed then deduplicated data" is smaller in size than the "first deduplicated then compressed data" ("Yes" branch from block 210) then the compression and deduplication order application 104 stores (at block 212) the "first compressed then deduplicated data" in the data structure referred to as the deduplicated and compressed data 116 (shown in FIG. 1) and then stores (at block 214) in the header 118 of the deduplicated and compressed data 116 the compression scheme and the deduplication scheme (e.g., chunks and hashing technique used) used to compress and deduplicate the data, and an indicator that data was first compressed then deduplicated.

If the "first compressed then deduplicated data" is not smaller in size than the "first deduplicated then compressed data" ("No" branch from block 210) then the compression and deduplication order application 104 stores (at block 216) the "first deduplicated then compressed data" in the data structure referred to as the deduplicated and compressed data 116 (shown in FIG. 1) and then stores (at block 218) in the header 118 of the deduplicated and compressed data 116 the compression scheme and the deduplication scheme (e.g., chunks and hashing technique used) used to compress and deduplicate the data and an indicator that data was first deduplicated then compressed. From blocks 214 and 218 control proceeds to block 220 where the process stops.

Therefore, FIG. 2 illustrates certain embodiments in which the ordering of compression and deduplication that results in a smaller size for the data is used to compress and deduplicate the data. For example, in certain embodiments if compression followed by deduplication results in a greater reduction of the original data in comparison to deduplication followed by compression then the file that results from compression followed by deduplication is stored. In certain embodiments, if deduplication followed by compression results in a greater reduction of the original data in comparison to compression followed by deduplication then the file that results from deduplication followed by compression is stored. As a result, the amount of storage space needed to save data is reduced.

Figure 3:
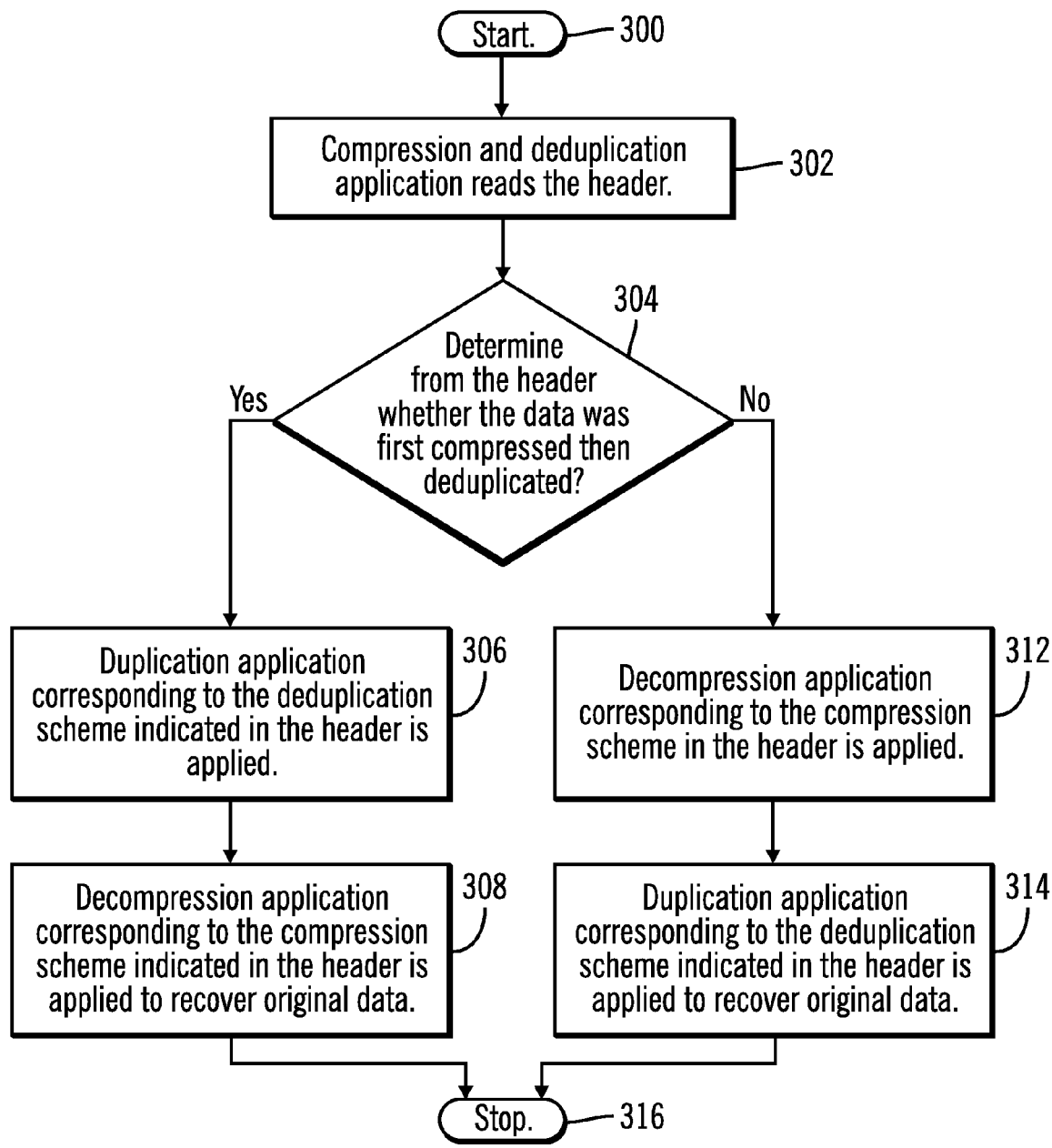
FIG. 3 illustrates a second set of operations for duplicating and decompressing stored data, in accordance with certain embodiments.

FIG. 3 illustrates a second set of operations for duplicating and decompressing stored data, in accordance with certain embodiments.

Control starts at block 300 and proceeds to block 302 where the compression and deduplication application 104 reads the header 118 of the deduplicated and compressed data 116.

The compression and deduplication application 104 determines (at block 304) from the header 118 whether the data 114 was first compressed then deduplicated to generate the deduplicated and compressed data 118.

If the data 114 was first compressed then deduplicated to generate the deduplicated and compressed data 116 ("Yes" branch from block 304) then the duplication application 112 corresponding to the deduplication scheme indicated in the header 118 is applied (at block 306) and subsequently the decompression application 108 corresponding to the compression scheme indicated in the header 118 is applied (at block 308) to recover the original data 114.

If the data 114 was first deduplicated then compressed to generate the deduplicated and compressed data 116 ("No" branch from block 304) then the decompression application 108 corresponding to the compression scheme indicated in the header 118 is applied (at block 312) and subsequently the duplication application 112 corresponding to the deduplication scheme indicated in the header 118 is applied (at block 314) to recover the original data 114. From blocks 308 and 314 control proceeds (at block 310) to a stop.

Therefore, FIG. 3 illustrates certain embodiments that allow the reconstruction of the data 114 from the deduplicated and compressed data 116 based on the information stored in the header 118 of the deduplicated and compressed data 116.

Figure 4:
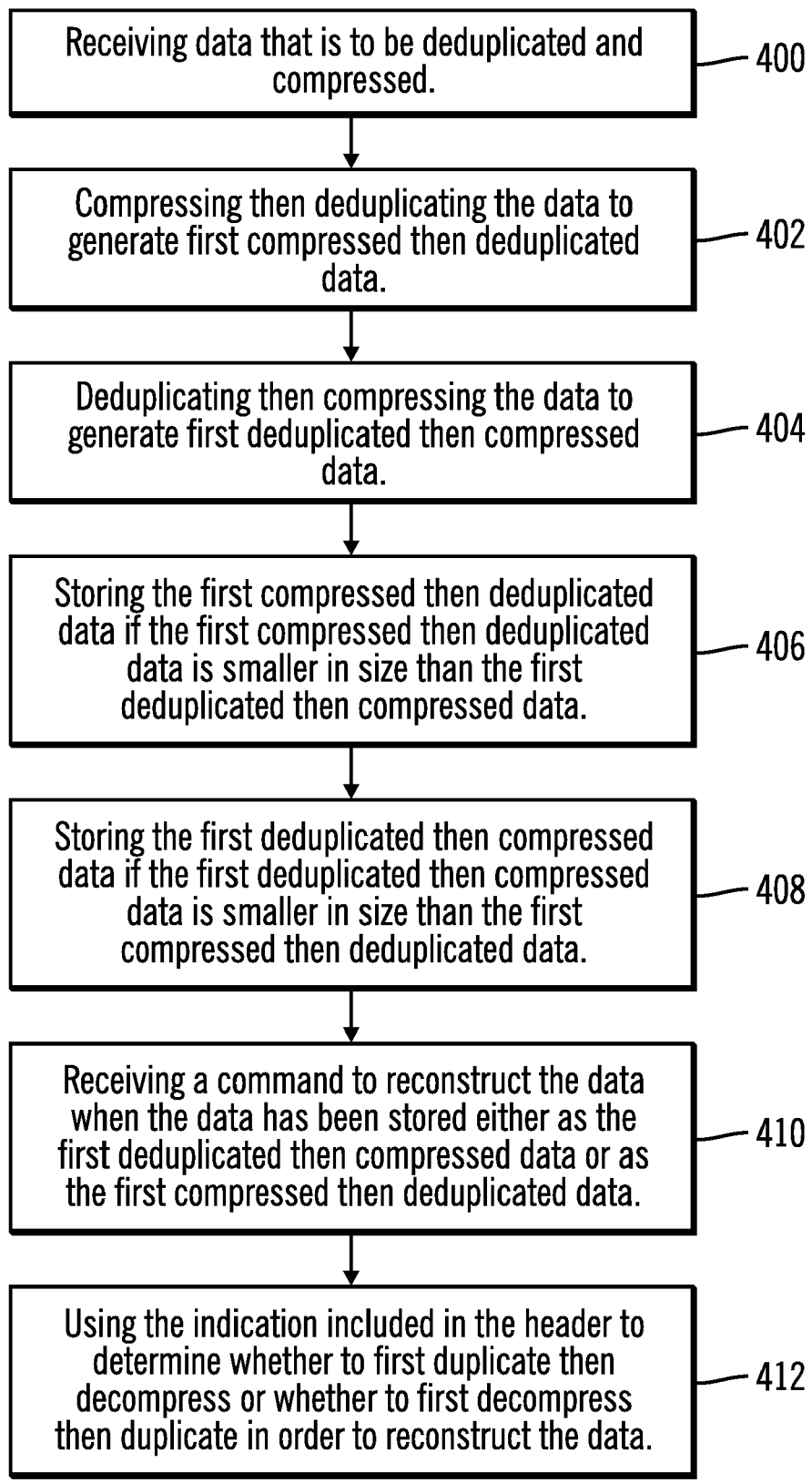
FIG. 4 illustrates a third set of operations for determining the order in which compression and deduplication are to be performed for storing data and for reconstructing the original data from the stored data, in accordance with certain embodiments.

FIG. 4 illustrates a third set of operations for determining the order in which compression and deduplication are to be performed for storing data and for reconstructing the original data from the stored data, in accordance with certain embodiments.

Control starts at block 400 where data 114 that is to be deduplicated and compressed is received. Control proceeds to block 402, where the data 114 is compressed then deduplicated to generate first compressed then deduplicated data. At block 404 (which may also be performed in parallel to block 402) the data 114 is deduplicated then compressed to generate first deduplicated then compressed data.

The first compressed then deduplicated data is stored (at block 406) if the first compressed then deduplicated data is smaller in size than the first deduplicated then compressed data. The first deduplicated then compressed data is stored (at block 408 which may also be performed in parallel to block 406) if the first deduplicated then compressed data is smaller in size than the first compressed then deduplicated data.

After the elapse of a period of time, a command is received (at block 410) to reconstruct the data 114 when the data 114 has been stored either as the first deduplicated then compressed data or as the first compressed then deduplicated data in the data structure referred to as the deduplicated and compressed data 116. The indication included in the header 118 is used to determine (at block 412) whether to first duplicate then decompress or whether to first decompress then duplicate in order to reconstruct the data 114.

Therefore, FIG. 4 illustrates certain embodiments in which the ordering of compression and deduplication that results in a greater reduction of the original data is used for the storage of deduplicated and compressed data. Information stored in the header of the deduplicated and compressed data is used to perform decompression and duplication to recover the original data.

In certain alternative embodiments, a plurality of compression applications and a plurality of deduplication applications are used to determine which compression and which deduplication application when ordered generates the smallest size deduplicated and compressed data, wherein a decision for whether to first compress then deduplicate or whether to first deduplicate then decompress is made for each file of a plurality of files.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
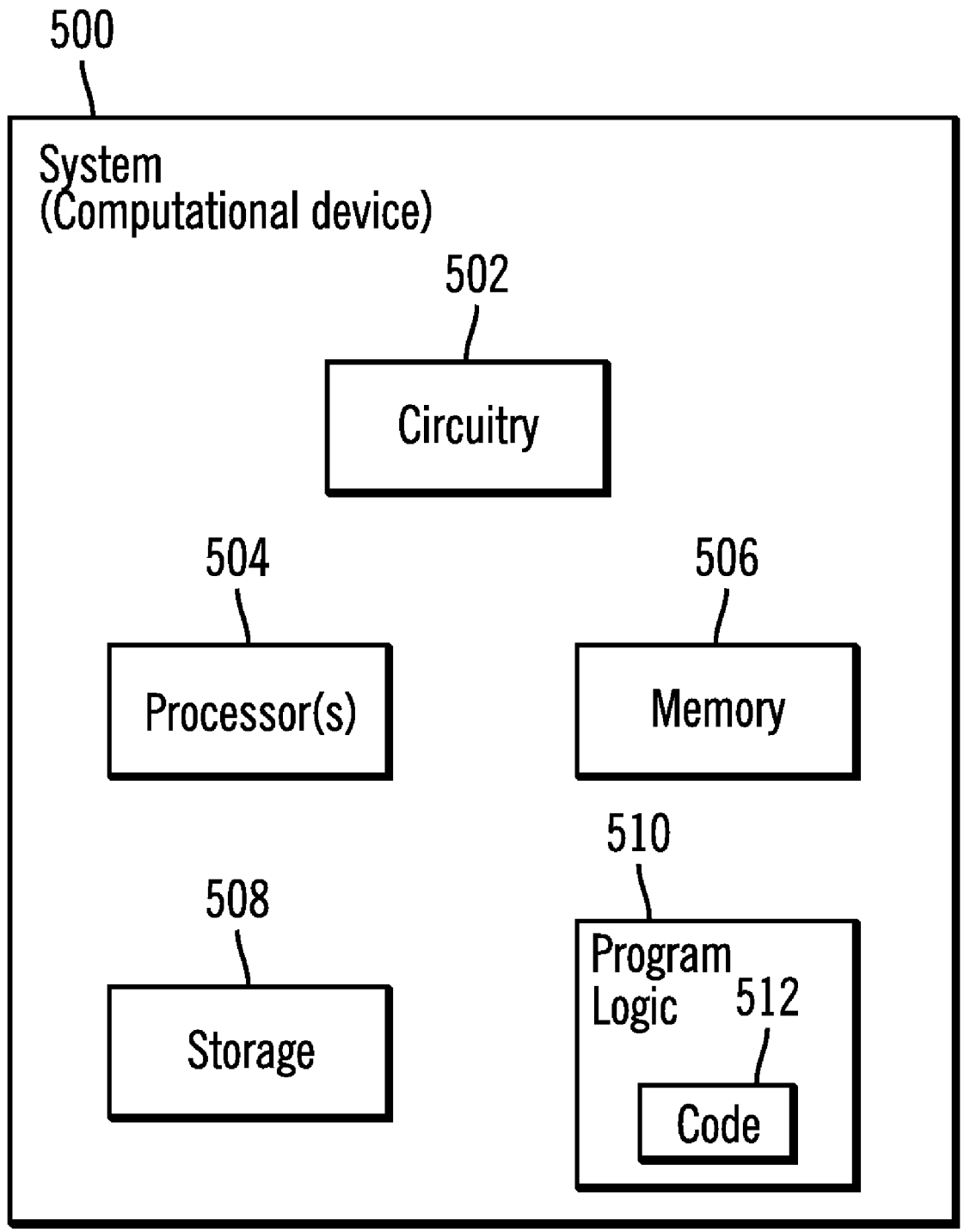
FIG. 5 illustrates a block diagram that shows certain elements that may be included in the computational device of FIG. 1, in accordance with certain embodiments.

FIG. 5 illustrates a block diagram that shows certain elements that may be included in computational device 102 in accordance with certain embodiments, where the computational device 102 may also be referred to as a system 500, and may include a circuitry 502 that may in certain embodiments include a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
  receiving data that is to be deduplicated and compressed;
  compressing then deduplicating the data to generate first compressed then deduplicated data;
  deduplicating then compressing the data to generate first deduplicated then compressed data;
  storing the first compressed then deduplicated data, in response to determining that the first compressed then deduplicated data is smaller in size than the first deduplicated then compressed data; and
  storing the first deduplicated then compressed data, in response to determining that the first deduplicated then compressed data is smaller in size than the first compressed then deduplicated data.

2. The method of claim 1, further comprising:
  maintaining a header corresponding to either the first compressed then deduplicated data or the first deduplicated then compressed data, wherein the header includes an indication of:
  (i) whether the data was first compressed then deduplicated or whether the data was first deduplicated then compressed;
  (ii) a compression scheme used on the data; and
  (iii) a decompression scheme used on the data.

3. The method of claim 2, further comprising:
  receiving a command to reconstruct the data when the data has been stored either as the first deduplicated then compressed data or as the first compressed then deduplicated data; and
  using the indication included in the header to determine whether to first duplicate then decompress or whether to first decompress then duplicate in order to reconstruct the data.

4. The method claim 1, wherein a plurality of compression applications and a plurality of deduplication applications are used to determine which compression and which deduplication application when ordered generates the smallest size deduplicated and compressed data, and wherein a decision for whether to first compress then deduplicate or whether to first deduplicate then decompress is made for each file of a plurality of files.

5. A system, comprising:
  a memory; and
  a processor coupled to the memory, wherein the processor performs operations, the operations comprising:
  (i) receiving data that is to be deduplicated and compressed;
  (ii) compressing then deduplicating the data to generate first compressed then deduplicated data;
  (iii) deduplicating then compressing the data to generate first deduplicated then compressed data;
  (iv) storing the first compressed then deduplicated data, in response to determining that the first compressed then deduplicated data is smaller in size than the first deduplicated then compressed data; and
  (v) storing the first deduplicated then compressed data, in response to determining that the first deduplicated then compressed data is smaller in size than the first compressed then deduplicated data.

6. The system of claim 5, the operations further comprising:
  maintaining a header corresponding to either the first compressed then deduplicated data or the first deduplicated then compressed data, wherein the header includes an indication of:
  (i) whether the data was first compressed then deduplicated or whether the data was first deduplicated then compressed;
  (ii) a compression scheme used on the data; and
  (iii) a decompression scheme used on the data.

7. The system of claim 6, the operations further comprising:
  receiving a command to reconstruct the data when the data has been stored either as the first deduplicated then compressed data or as the first compressed then deduplicated data; and using the indication included in the header to determine whether to first duplicate then decompress or whether to first decompress then duplicate in order to reconstruct the data.

8. The system claim 5, wherein a plurality of compression applications and a plurality of deduplication applications are used to determine which compression and which deduplication application when ordered generates the smallest size deduplicated and compressed data, and wherein a decision for whether to first compress then deduplicate or whether to first deduplicate then decompress is made for each file of a plurality of files.

9. An article of manufacture including code, wherein the code when executed by a processor causes operations, the operations comprising:
   receiving data that is to be deduplicated and compressed;
   compressing then deduplicating the data to generate first compressed then deduplicated data;
   deduplicating then compressing the data to generate first deduplicated then compressed data;
   storing the first compressed then deduplicated data, in response to determining that the first compressed then deduplicated data is smaller in size than the first deduplicated then compressed data; and
   storing the first deduplicated then compressed data, in response to determining that the first deduplicated then compressed data is smaller in size than the first compressed then deduplicated data.

10. The article of manufacture of claim 9, the operations further comprising:
    maintaining a header corresponding to either the first compressed then deduplicated data or the first deduplicated then compressed data, wherein the header includes an indication of:
    (i) whether the data was first compressed then deduplicated or whether the data was first deduplicated then compressed;
    (ii) a compression scheme used on the data; and
    (iii) a decompression scheme used on the data.

11. The article of manufacture of claim 10, the operations further comprising:
    receiving a command to reconstruct the data when the data has been stored either as the first deduplicated then compressed data or as the first compressed then deduplicated data; and
    using the indication included in the header to determine whether to first duplicate then decompress or whether to first decompress then duplicate in order to reconstruct the data.

12. The article of manufacture claim 9, wherein a plurality of compression applications and a plurality of deduplication applications are used to determine which compression and which deduplication application when ordered generates the smallest size deduplicated and compressed data, and wherein a decision for whether to first compress then deduplicate or whether to first deduplicate then decompress is made for each file of a plurality of files.

13. A method for deploying computing infrastructure, comprising integrating machine-readable code into a machine, wherein code in combination with the machine is capable of performing:
    receiving data that is to be deduplicated and compressed;
    compressing then deduplicating the data to generate first compressed then deduplicated data;
    deduplicating then compressing the data to generate first deduplicated then compressed data;
    storing the first compressed then deduplicated data, in response to determining that the first compressed then deduplicated data is smaller in size than the first deduplicated then compressed data; and
    storing the first deduplicated then compressed data, in response to determining that the first deduplicated then compressed data is smaller in size than the first compressed then deduplicated data.

14. The method for deploying computing infrastructure of claim 13, wherein the code in combination with the machine is further capable of performing:
    maintaining a header corresponding to either the first compressed then deduplicated data or the first deduplicated then compressed data, wherein the header includes an indication of:
    (i) whether the data was first compressed then deduplicated or whether the data was first deduplicated then compressed;
    (ii) a compression scheme used on the data; and
    (iii) a decompression scheme used on the data.

15. The method for deploying computing infrastructure of claim 14, wherein code in combination with the machine is further capable of performing:
    receiving a command to reconstruct the data when the data has been stored either as the first deduplicated then compressed data or as the first compressed then deduplicated data; and
    using the indication included in the header to determine whether to first duplicate then decompress or whether to first decompress then duplicate in order to reconstruct the data.

16. The method for deploying computing infrastructure claim 13, wherein a plurality of compression applications and a plurality of deduplication applications are used to determine which compression and which deduplication application when ordered generates the smallest size deduplicated and compressed data, and wherein a decision for whether to first compress then deduplicate or whether to first deduplicate then decompress is made for each file of a plurality of files.

17. The method of claim 1, wherein:
    deduplicating the data comprises eliminating duplicate files in a storage system; and
    compressing the data comprises eliminating redundant data within a file.

18. The system of claim 5, wherein:
    deduplicating the data comprises eliminating duplicate files in a storage system; and
    compressing the data comprises eliminating redundant data within a file.

19. The article of manufacture of claim 9, wherein:
    deduplicating the data comprises eliminating duplicate files in a storage system; and
    compressing the data comprises eliminating redundant data within a file.

20. The method for deploying computing infrastructure of claim 13, wherein:
    deduplicating the data comprises eliminating duplicate files in a storage system; and
    compressing the data comprises eliminating redundant data within a file.

* * * * *